United States Patent [19]
Bryman

[11] Patent Number: 6,100,532
[45] Date of Patent: Aug. 8, 2000

[54] DETECTOR FOR GAMMA RAYS

[75] Inventor: Douglas Bryman, Vancouver, Canada

[73] Assignee: Triumf, Vancouver, Canada

[21] Appl. No.: 09/041,445

[22] Filed: Mar. 12, 1998

Related U.S. Application Data

[60] Provisional application No. 60/040,572, Mar. 14, 1997.
[51] Int. Cl.[7] .................................................... G01T 1/164
[52] U.S. Cl. .......................... 250/369; 250/367; 250/369; 250/374
[58] Field of Search ..................... 250/369, 367, 250/368, 370.11, 389, 394, 374, 375, 376, 377, 378, 379, 380, 381, 382, 383, 384, 385.1, 385.2, 388

[56] References Cited

U.S. PATENT DOCUMENTS 4,058,721  11/1977  Reiss et al. .............................. 250/374
5,118,948   6/1992  Ito et al. .................................. 250/369

OTHER PUBLICATIONS

Nuclear Instruments and Method in Physics Research, A 348 (1994), pp. 577–582, "Recent advances in instrumentation for positron emission tomography" by Simon R. Cherry.
Nuclear Instruments and Method in Physics Research, A 353 (1994), pp. 189–194, "PET detector modules based on novel detector technologies" by William W. Moses et al.
IEEE Transactions on Nuclear Science, vol. NS–30, No. 1, Feb. 1983, "The High–Density Avalanche for Positron Emission Tomography" by A. Jeavons et al.
Nuclear Instruments and Methods, 176 (1980), pp. 89–97, "Proportional Chamber Positron Camera For Medical Imaging" by A. Jeavons et al.
Nuclear Instruments and Methods in Physics Research, A310 (1991), pp. 423–434, "Nonmedical applications of a positron camera" by M. R. Hawkesworth et al.
Nuclear Instruments and Methods in Physics Research, A253 (1986), pp. 145–157, "A Positron Camera For Industrial Application" by M. R. Hawkesworth et al.

*Primary Examiner*—Constantine Hannaher
*Assistant Examiner*—Otilia Gabor

[57] ABSTRACT

A gamma ray detector for determining the position of gamma ray interactions has at least one module. Each module has a converter for converting gamma rays to charged particles, a scintillator for emitting light in response to charged particles produced by the converter, a photodetector to determine when light has been emitted from the scintillator, a two-coordinate position detector for determining the X and Y coordinates of charged particles interacting with the position detector, and a signal device for signaling the presence of emitted light in the photodetector and for activating the position detector.

24 Claims, 4 Drawing Sheets

DETECTOR FOR GAMMA RAYS

This application claims the benefit of U.S. Provisional Application Ser. No. 60/040,572, filed on Mar. 14, 1997.

The present invention relates to a gamma ray detector for determining the positions of gamma ray interactions with a plurality of the detectors arrayed for producing an image of a scanned object. More particularly, the invention relates to such a detector which can determine the X, Y and Z coordinates of each interaction, and optionally determine the angle of the gamma ray causing such interaction.

BACKGROUND OF THE INVENTION

Gamma ray detectors are used in a wide variety of apparatus, such as in positron emission tomograph (PET), single photon emission-computed tomograph (SPECT), explosive detectors, and the like. All of such apparatus depend upon, in part, detectors which can determine the position of interactions of gamma rays with the detectors, such that with a plurality of such position measurements, a scan of an object of interest can be made. These techniques are well known in the art and need not be detailed herein.

The difficulty with all such detectors is that in order to perform a scan, a multiplicity of such detectors are necessary, and the positions of interactions of gamma rays with the detectors must be determined so that with a plurality of such determinations, e.g. in the millions, sufficient data is obtained to produce an accurate scan image of the object of interest. Since each of the detectors must be capable of generating position data for a gamma ray interaction, acquisition of such position data and the compilation thereof, e.g. by a computer, requires very substantial and expensive apparatus. Typically, the data of such detectors is initiated by a generation of light in a scintillator material of the detector as the gamma ray interacts therewith. By determining the detector in which such light was emitted, and the position of that emitted light within the detector, a data point for a scan is produced. By providing a multiplicity of such detectors, which can, depending upon the application, be in the thousands of detectors, a multiplicity of data points can be acquired and, by computer compilation, resolved into an image of the object of interest being scanned.

Typically, for example, four photodetectors will be instrumented with an array of scintillating detectors where the photodetectors detect the emission of light in the scintillating detectors. A logic circuit can be employed to determine the position of emitted light. However, as can be appreciated, the monitoring instrumentation, including the photodetectors, logic circuits and related controller and signal devices (referred to collectively as a read-out channel) results in very complex monitoring instrumentation, especially when a large number of detectors are required for the intended scan.

In addition, the usual detector for such gamma ray scanning devices is an inorganic scintillating crystalline material, e.g. cerium doped lutetium oxyorthosilicate (LSO) and bismuth germinate (BGO), which is, in and of itself, expensive. The crystalline material is a scintillator material which will emit light and therefore the position of interaction of a gamma ray can be determined. The X-Y position resolution of such detectors is typically 20 square millimeters and typically is not uniform for all positions, and this leaves a basic inaccuracy in not knowing precisely where in the detector, i.e. in the X and Y coordinates, that interaction occurred. In addition, the depth of the interaction, i.e. the Z coordinate, is generally not determined, or is poorly determined, resulting in a so-called parallax error and further image inaccuracy. Those effects result in less than desirable accuracy of scan images for the object of interest.

As can be appreciated from the above, it would be of decided advantage to the art to provide a gamma ray detector which can be inexpensively constructed, requires far less monitoring instrumentation for acquisition of the required data, and which can determine the X, Y and Z coordinates of the gamma ray interaction.

SUMMARY OF THE INVENTION

It has now been found that an improved gamma ray detector can be provided such that a large number of the detectors can be monitored by a single apparatus with a very reduced number of monitoring instruments (collectively referred to as read-out channels), such that the total number and complexity of monitoring instruments required for an array of the detectors is much less than that required by prior art detectors. In addition, the present detector can determine the X, Y and Z coordinates of the interaction of a gamma ray with the detector, and those coordinates produce more accurate data points for compilation of a gamma ray scan image.

The invention is based on several primary and subsidiary observations and discoveries. First of all, it was observed that rather than using a crystalline material for the detector which acts as an interactive scintillator for the gamma rays, an inactive converter (one which does not produce light as in the prior art) may be used to intercept and convert the gamma rays to charged particles, which in turn may be used to determine the X and Y positions.

As another primary observation, it was found that instead of using the crystalline scintillating material of the prior art to determine the position of interaction of a gamma ray, a conventional two-coordinate position detector can be used for determining the X and Y coordinates of the charged particles produced by the converter and interacting with that two-coordinate position detector. This greatly simplifies the overall detector.

As a primary discovery, it was found that with the charged particles produced by the converter, a small light-emitting scintillator may be used to signal the gamma ray interaction in the converter, and that scintillator need not be a crystalline material but can be a very common and inexpensive material, such as clear scintillating plastic. Such clear scintillating plastic and the like can be in the form of plates, rods, and especially fibers, etc., which are flexible, and those fibers can be gathered into a bundle so that an entire bundle of fibers can be monitored by a single photodetector and bundles of fibers from multiple detectors can be monitored by a single photodetector.

As a major discovery, it was found that a signaling device can therefore be used for signaling the presence of emitted light in the scintillator, and that signaling device can activate or inactivate the various position detectors, such that very reduced monitoring instrumentation can determine which detector has been activated by interaction with a gamma ray and, accordingly, determine the X and Y position thereof. The Z coordinate which is along the direction of the gamma ray is given by the location of the position detected.

Accordingly, briefly stated, the present invention provides a gamma ray detector for determining the position of gamma ray interactions. The detector has at least one module, and each module has a converter for converting gamma rays into charged particles. A scintillator is provided for emitting light in response to the charged particles produced by the converter. A photodetector determines when light has been emitted from the scintillator. A two-coordinate position detector is provided for determining the X, Y and Z coordinates of charged particles interacting with the position detector. A controller and signal device is provided for signaling the presence of emitted light in the photodetectors and for activating the position detector.

DESCRIPTION OF PREFERRED EMBODIMENTS

Figure 1:
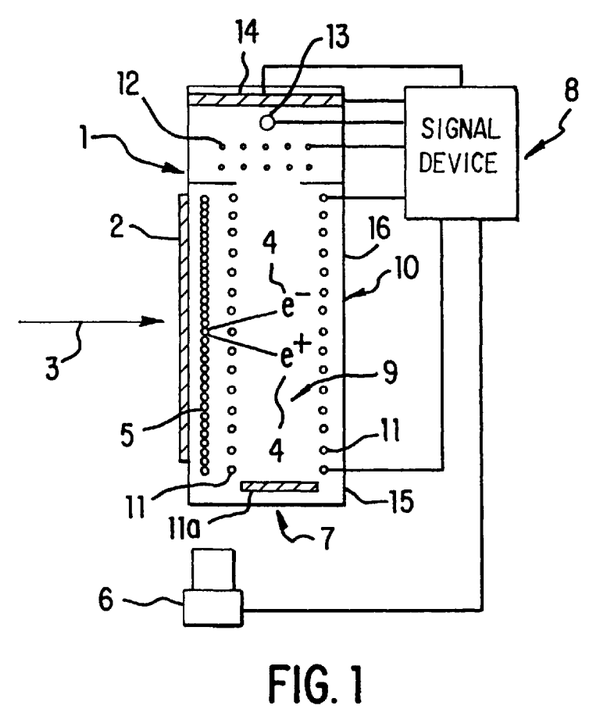
FIG. 1 is an idealized schematic cross-sectional view of the detector of the present invention.

FIG. 1 is a highly idealized schematic cross-sectional view of the basic components of the present detector. These basic components, together, are referred to as a module, since a plurality of modules can be grouped into an array of modules stacked along the direction of the gamma ray, or the Z, direction. The basic module, generally 1, has as the primary elements a converter 2, for converting gamma rays 3 into charged particles 4. A scintillator 5 emits light in response to the charged particles 4 produced by converter 2. A photodetector 6 determines when light has been emitted from the scintillator 5. A two-coordinate position detector, generally 7, determines the X and Y coordinates of charged particles interacting with the position detector 7. A controller and signal device (read-out channel), generally 8, signals the presence of emitted light in the photodetector.

Figure 3:
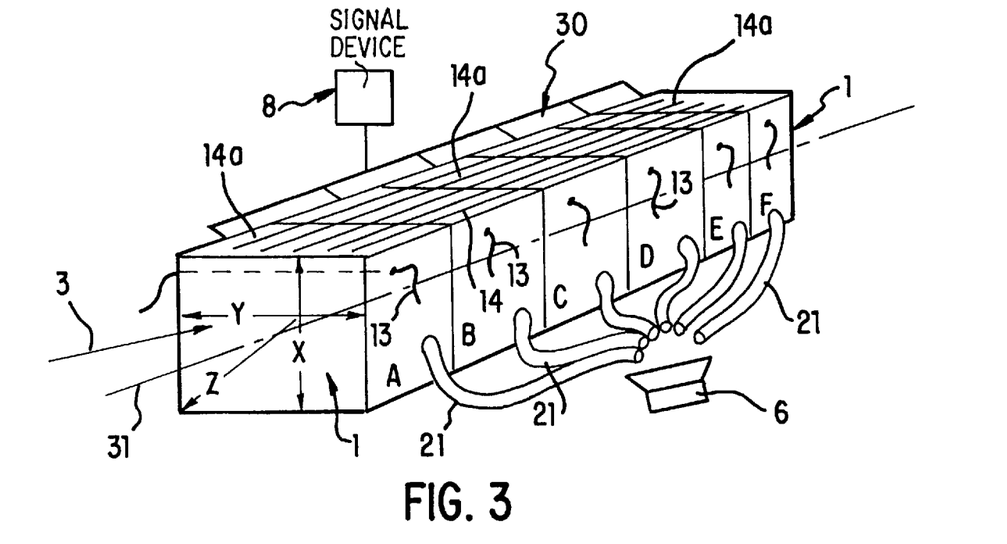
FIG. 3 shows an array of the detectors with each detector in the array having a common center line.

Aside from the controller and signal device 8, therefore, the primary components of the module are the converter 2, the scintillator 5, and the two-coordinate position detector 7. These three elements are sandwiched together in order to provide a module, generally 1. Note that FIG. 3 shows a plurality of modules 1 arrayed together, which array will be discussed more fully hereinafter.

Figure 2:
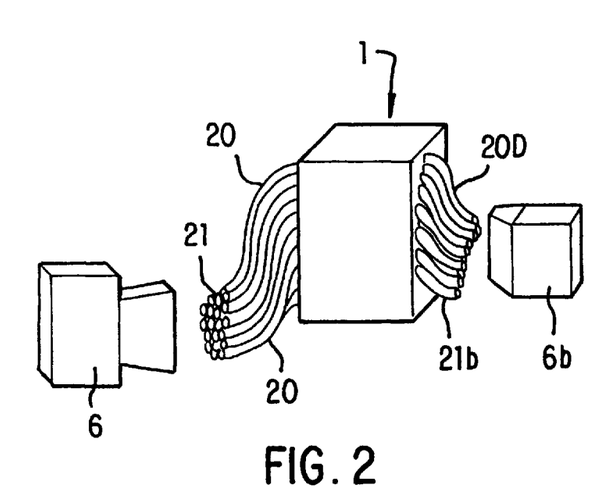
FIG. 2 shows the detector of the present invention with scintillator fibers bundled together for monitoring by a single photodetector.

In the embodiment shown in FIG. 2, the scintillator is composed of a plurality of flexible scintillating plastic plates, rods, and especially fibers, etc., 20 which are bundled at ends 21 so that all of the scintillator fibers 20 can be monitored by a single photodetector 6. In the present invention, as opposed to the prior art, these scintillator fibers 20 are not used to determine the X and Y position of the charged particles 4 resulting from the gamma ray 3 interacting with converter 2, but are merely used for causing light to be emitted in the scintillator 5 so as to produce a light signal detectable by photodetector 6. An electrical signal is produced by photodetector 6 and that signal is used to trigger functions of controller and signal device 8, as explained more fully hereinafter.

The two-coordinate position detector 7 can be a variety of well known two-coordinate position detectors, such as, for example, a gas gain ionization detector, a multi-wire proportional detector, a micro-strip detector, a micro-gap chamber detector, and a time projection-chamber detector, and the like. However, the preferred position detector is a gas gain ionization drift detector, and more particularly in this regard, an avalanche gain proportional drift chamber detector. The drift chamber detector, being the most preferred embodiment of the two-coordinate position detectors, is illustrated in FIG. 1. Functions of detectors of the above-described nature are well known in the art (see, for example, *Physical Review D*, Jul. 1, 1996, published by The American Physical Society, Vol. 54, No. 1) and, accordingly, will not be detailed herein, with the exception of the most preferred embodiment for explanatory purposes.

As shown in FIG. 1, a gamma ray 3 is converted in converter 2 to charged particles (an electron-positron pair or Compton electron). Those charged particles can cause emission of light in very simple scintillators, as explained more fully below, and the emitted light is sensed by photodetector 6, for signal and control purposes, as discussed below. The charged particles enter the position detector 7 which is filled with an ionizable gas, generally 9, in a drift chamber, generally 10. The charged particles cause ionization electrons to be formed from the ionizable gas. The time of drift of ionization electrons in drift chamber 10 from the original ionization, signaled by the scintillator 5, to the anode 13 is used to determine the X position of interaction of the gamma ray 3 with module 1. The Y position is determined by an induced charge of cathode 14, all of which is explained in detail below. The Z coordinate of the gamma ray interaction is given by the location of the particular drift chamber activated by the gamma ray.

Electric field strips or elements 11 and 11a produce an electric field gradient along the vertical direction of the drift chamber (vertical direction is used only as a designator and not as a spatial direction). The electric field gradient causes the ionization electrons to drift upwardly (again designation and not direction) in drift chamber 10. The ionization electrons will encounter a grating device 12 which is usually biased to block their passages but which can be switched to transmit the ionization electrons. The grating device 12 can be simply a series of charged wires so as to produce an electric field around those wires sufficient that the ionization electrons cannot pass therethrough. Such grating devices are known in the art (see Bryman et al, Nuc. Instr. Meth. A234 (1985) 42–46) and need not be detailed herein. However, when light is emitted from scintillator 5, a signal (e.g. voltage) is generated in photodetector 6 which is connected to controller and signal device 8. The presence of light in scintillator 5 causes the electric field of grating device 12 to be controlled such as to allow the ionization electrons to pass therethrough, as explained in detail in the above-cited Bryman et al publication.

An anode, e.g. 20 micron diameter gold plated tungsten elongated anode wire, 13, is disposed above the grating device 12, and when light emission from scintillator 5 is sensed by photodetector 6, the grating device 12 is opened to transmission of the ionization electrons, again as described in detail in the above-cited Bryman et al publication. The ionization electrons migrate toward and induce a current in the anode 13 (see Fulda-Quenzer et al, Nuc. Instr. Meth. A235 (1985) 517–522 for a full explanation of this function).

In usual gas gain ionization detectors, using e.g. argon/methane gas, the electrical field created by electric field elements 11 and 11a cause electrons, produced in the ionization gases by the charged particles 4, to drift upwardly at velocities of about 7 centimeters per microsecond, e.g. with an electric field of 25 kV/m, produced by electric field elements 11 and 11a. Thus, for example, if the drift chamber is 10 centimeters in height, the maximum time delay for the ionization electrons to drift through the drift chamber and induce current in the anode 13 is about 1.4 microseconds, which is quite small. However, much shorter drift chambers, e.g. as little as a few centimeters in height, may be used which will produce very short time delays.

The ionization electrons induce current in anode 13 such that there is a large multiplied gain (an "avalanche"), e.g. somewhere in the range of about $5 \times 10^4$. Thus, the time interval between the detection of light emission in scintillator 5 by photodetector 6 (and the concurrent formation of ionization electrons in gas 9) and the detection of a current in anode 13 can be used to calculate the position in module 1 of gamma ray interaction with respect to the X position (see FIG. 3). For example, assume that gamma ray 3, shown in FIG. 1, enters module 1 at about the mid point, as shown in FIG. 1, and produces a time interval of A. If that gamma ray entered the module 1 at a lower position than that shown in FIG. 1, that time interval would be A+B. On the other hand, if the gamma ray entered the module at a position higher than that shown in FIG. 1, the time interval would be A−B. Thus, the time interval between light being sensed by photodetector 6 and the induced current in anode 13 is proportional to the X position of the charged particles produced by gamma ray 3.

To provide the Y position, a series of conducting cathodes 14 (e.g. wires, plates, strips, etc.) are placed in module 1. A substantial advantage of the present invention is that the cathodes can be common to a series of modules in an array, as explained below. As shown in FIG. 3, the cathodes 14a are spaced along each module 1 so that an array of cathodes 14a are presented along the transverse of the Y direction of the module. Current is induced in one of the cathodes or in several or more of the cathodes by the avalanche of ionization electrons occurring on anode 13. The particular cathode (s) involved can be determined by the existence of an electrical charge induced into that cathode(s) or by the pattern of charges induced in several cathodes, and thus the Y position of the interaction of the gamma ray with the module can be determined. Cathode strips or pads of small dimension, e.g. 5 mm, arrayed at spacings of about 6 mm will provide very accurate results.

Of course, to operate the module, as described above, power supplies, voltage regulators, timing devices, voltage and charge measuring devices, and logic circuits, all of which are well known in the art, must be provided by controller and signal device 8. These devices are, collectively, part of the read-out channel and are well known in the art and need not be described in detail herein for sake of conciseness.

The present device has the further advantage in that by using the present combination of converter, scintillator and position detector, inexpensive materials may be used for each. Thus, the converter may be any high density material, since it is only necessary to convert the gamma rays to charged particles. For example, with low energy gamma rays, the converter could simply be a thin water chamber. However, at higher energies, the required thickness of a water chamber would be impractical. For lower gamma ray energies, plastics or ceramics may be used, but the more practical converters are metals, and especially high density metals, since these will provide the converter functions at relatively low thicknesses. While any metal can be used, titanium, tungsten, gold, silver, copper and lead are preferred, and especially lead, in view of its very high density and being inexpensive. For example, with a 9 MeV gamma ray, a 0.15 mm thickness of lead is sufficient for converter purposes. Thicknesses of 0.01 to 2.0 mm will be useful for most gamma ray energies.

The scintillator of the present invention can be any material which will generate and transmit light induced by interaction with the charged particles. As opposed to the prior art where the scintillator is a special crystal, e.g. BGO, so that the gamma rays directly act on the scintillator and emit light, the present scintillator need only interact with the charged particles for producing light. Thus, the present scintillators can be of a wide range of materials, as opposed to the prior art, since many materials will interact with charged particles for emitting light. Preferred scintillator materials are either crystalline materials or a scintillating plastic, and while the crystalline materials may be the crystals of the prior art, e.g. BGO, there is no need to use such expensive materials and less expensive materials, e.g. plastic scintillators, are preferred. A large number of light-emitting plastic scintillators are known (see the *Physical Review* publication cited above and a variety are manufactured by Bicron of Newbury, Ohio, U.S.A.), and need not be detailed herein. The preferred form of the scintillator is a light-emitting scintillating plastic. Such plastic scintillators also have further advantages. When the plastic scintillator is clear and in an elongated fiber configuration, which is also flexible, this allows the ends of those fibers 20, which protrude from the module 1, as shown in FIG. 2, to be gathered into a bundle 21, as shown in FIG. 2, and monitored by a single photodetector 6. A number of bundles 21 of a number of modules 1 can also be gathered and monitored by a single photodetector 6, as shown in FIG. 3. Preferred plastic scintillators are polystyrene-based core with a polymethylmethacrylate optical cladding (see General Catalog of Bicron). Another advantage of plastic scintillators over most crystalline materials is a faster response time.

The scintillator should be essentially substantially transverse to the direction of the gamma ray, as shown in FIG. 1. However, substantially, in this regard, means only that the scintillator should be such that it can intercept the charged particles and emit light in a manner which can be detected by the photodetector 6. The scintillator could be in plate form or sheet form or other form, but the preferred form is where the scintillator 5 is in the form of the elongated, flexible fibers formed into a row, as shown in FIG. 1, where adjacent fibers touch one another, or in multiples of such rows. Thus, in that preferred form, a plurality of adjacent fiber scintillators are arranged in directions which are substantially transverse to the direction of the gamma ray, and those elongated plastic fiber scintillators are bundled, as shown in FIG. 2, so as to be monitored by a single photodetector 6, i.e. where at least one photodetector is disposed near at least one end of a plurality of the scintillators. Also as shown in FIG. 2, a similar bundle 21b of fibers 20D could protrude from the opposite end of module 1 and be likewise bundled so that a photodetector 6b may be used for summation and discrimination of signals from an array of modules for the purposes explained below.

Since the scintillators are made of a light-emitting scintillating plastic or the like, for very low energy levels of the gamma ray, light can be emitted by direct interaction of the gamma rays with the scintillator 5, and in this case, it would not be necessary to have a converter 2. Thus, where the gamma ray being detected is of very low energy level and the scintillator is of a dense scintillating plastic material, the scintillator also functions as the converter. This, however, is not a very usual case and is not a preferred form of the invention.

Also with the present invention, the photodetector can be a very inexpensive photomultiplier tube or photodiode, since the main purpose of the photodetector is to detect the emission of light in the scintillator 5 and produce a signal for operating grating device 12, as described above, as well as other portions of module 1, as discussed below.

Turning again to FIG. 1, the specifically illustrated drift chamber detector, as noted above, has a voltage gradient with decreasing voltage from near one end 15 of the chamber 10 to the opposite end 16 of the chamber 10 near grating device 12, a cathode 14 near the opposite end 16, and an anode 13 between the grating device 12 and the cathode 14. The construction of such drift chambers is well known (see Fulda-Quenzer et al, Nuc. Instr. Meth. A235 (1985), page 517; Bryman et al, Nuc. Instr. Meth A234 (1985), 42; and Hargrove et al, Nuc. Instr. Meth. 219 (1984), 461).

In this latter regard, as shown in FIG. 3, a preferred embodiment is where an array, generally 30, of modules 1 is assembled, e.g. by an adhesive, or stacked such that the center line 31 of each module 1 lies substantially on a common axis, i.e. the axis being center line 31. In a preferred embodiment of such an array 30, the cathode 14 of each module 1 is in the form of a pad or strip 14*a* and each strip 14*a* is connected to cathode strips 14*a* of an adjacent module 1 so as to form continuous cathode strips for the array of modules. By using this arrangement, the array 30 of modules 1 can be very inexpensively produced and inexpensively instrumented, such that the photodetector 6 and controller and signal device 8, shown in FIG. 1, can serve a plurality of modules 1, as shown in FIG. 3, disposed in an array 30.

In this latter regard, as noted above, the grating device 12 is transmitting or closed to passage of ionization electrons in response to the signal device 8 which in turn is responsive to the presence or absence of light in scintillator 5 as determined by the photodetector 6. Also as noted above, the grating device 12 is biased to prevent passage of the ionization electrons therethrough when the photodetector 6 does not sense light emitted in the scintillator 5 or when photodetector 6 is not the first photodetector in the array of the modules to be activated by charged particles 4. In this case, the grating device 12 is not electrically uncharged or modified in charge to allow passage of the ionization electrons.

Accordingly, only the first position detector in each array of modules 1, as shown in FIG. 3, is activated when light is emitted from scintillator 5. If light is not emitted from scintillator 5, that module remains inactive, or if light is emitted from scintillator 5 but the module is not the first module activated, that module remains inactive. Now considering FIG. 3, if gamma ray 3 converted to charged particles 4 does not activate the scintillator in module A, that module remains inactive. Likewise, for example, if the gamma ray 3 converted to charged particles 4 does not activate the scintillator in module B, that module also remains inactive. However, if the charged particles 4 produced by gamma ray 3 activates module C (which becomes the first activated module), then the photodetector 6 will open grating device 12 and, optionally, power electric field elements 11 and 11*a*, by way of controller and signal device 8, so as to cause a measurement of the X and Y positions of the charged particles 4 produced by converter 2 in response to gamma ray 3 in module C, as explained above. Thus, in this case, where module C is the first activated module, that module determines the X and Y positions, and no monitoring of the other modules A, B, D, E and F need be undertaken. This greatly simplifies the monitoring instrumentation and allows multiplexing of the scintillators 5, photodetector 6, and controller and signal device 8.

A preferred mode of activating a particular module is where the anode of a first activated module in an array has induced current by the ionization electrons. All other anodes of all other modules in the array have no such induced current and, hence, remain inactive. Thus, since only one module is, in turn, activated, only that activated module will produce a signal which can be utilized for determining the X and Y positions of the charged particles generated by the gamma ray. This allows cathode 14*a*, as shown in FIG. 3, to be a continuous strip, as noted above. This, further, simplifies manufacture of the array, and a single or small number of data acquisition and monitoring instrumentation (read-out channel), i.e. photodetectors 6 and controller and signal devices 8, may be used for an entire array 30 of many modules 1, as shown in FIG. 3.

Figure 4:
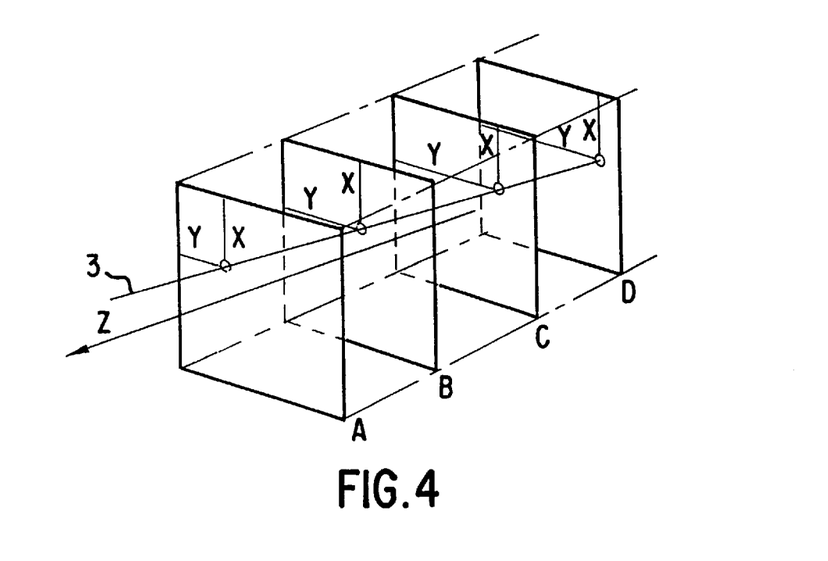
FIG. 4 is an idealized illustration of how an array of the present detectors can determine the angle at which a gamma ray penetrates the array of detectors.

With the present detector, it is also possible to determine the angle at which the gamma ray interacts with an array of modules. As shown in FIG. 4, for example, which is a highly idealized diagram of charged particle interactions with the modules and X and Y determinations, if, for example, in an array 30 of modules 1, four modules are successively activated, and each determines the X and Y coordinates, then by usual calculations, the X and Y coordinates of the interactions of modules A, B, C, D and E, for example, will allow the calculation of the angle at which the charged particles emanating from gamma ray 3 interacted with the array 30 of modules 1. In this case, a separate set of cathode strips and read-out channels would be required for each module, as explained below.

As noted above, the cathode determines the Y coordinate of the interaction by induction of a charge into the cathode 14, and particularly into a cathode strip 14*a*. The position of interaction on the cathode for determining the Y coordinate can be achieved by a number of different known apparatus. For example, an analog pulse height can be obtained with an analog-to-digital converter to determine the Y position of interaction on cathode strip 14*a* by obtaining the centroid of the induced charge of cathode strip 14*a*. The centroid of the induced charge, for example, can be determined by measuring the voltage or current at each end of a cathode strip 14*a*. Alternatively, conventional discriminators can be used to determine the patterns of strips where a charge is induced. A crude Y position, where great accuracy is not required, can be obtained simply by using a resistive wire for the anode and measuring the pulse height at each end to determine the Y coordinate. Alternatively, end-to-end timing information can be used to determine where along the length of the anode wire charge was induced to determine the Y coordinate.

When the scintillator is in plastic fiber form discussed above, using conventional scintillator plastics (such as KURARAY SCSN-38—a scintillator plastic, these fibers can be quite small, e.g. in the range of 1.0 millimeter in diameter. However, flat scintillator plates or strips may be used, and in this case, flexible or formed light guides attached to ends of the plates may be used to bundle the light guides for the purposes described above. Alternatively, commonly available wave length-shifting fibers or strips may be used for these purposes.

When an array of modules, such as shown in FIG. 3, is used, several modules downstream of the first module may simultaneously be struck by products of gamma ray conversions with subsequent interaction, but only the first module to be activated in the manner described above is required for determination of the X, Y and Z coordinates of the gamma ray interaction. In this case, the data acquisition can be limited to that first activated module by a conventional electronic logic circuit in controller and signal device 8. This allows read-out channels of the position detectors 7 to be combined in common (multiplex) arrangements for all modules. Activation of the read-out channel (photodetector 6 and controller and signal device 8) for the array 30 can be triggered by a minimum level of energy summed from all scintillators in the array or by detection of a minimum number of scintillators emitting light. These latter two approaches can eliminate false activation because of background radiation.

Again referring to FIG. 2, as described above, fibers 20 gathered into bundle 21 can be monitored by a single photodetector 6 for signal and control of device 8. Opposite ends of fibers 20 can protrude from module 1 as fibers 20b and form into bundles 21b which are monitored by photodetector 6b. Photodetector 6b (one for each module in an array 30) can, by timing thereof, determine which module in an array 30 was first activated (struck by a gamma ray 3). When a first to be activated module in an array of modules opens grating device 12 of that module, it can cause controller and signal device 8 to cause all other modules in the array to remain inactive.

Also, the fibers 20b and bundles 21b of a first module in one array can be bundled with a first module in a second array, a first module in a third array, and so on, so that a single photodetector can monitor the first module in a series of arrays of modules. Similar arrangements can be made for the second and third, and so on, modules in a series of arrays. With this arrangement, the Z coordinate can easily be determined by determining which module, e.g. the first or second or third, etc., of an array was first activated (struck) by a gamma ray.

Figure 5:
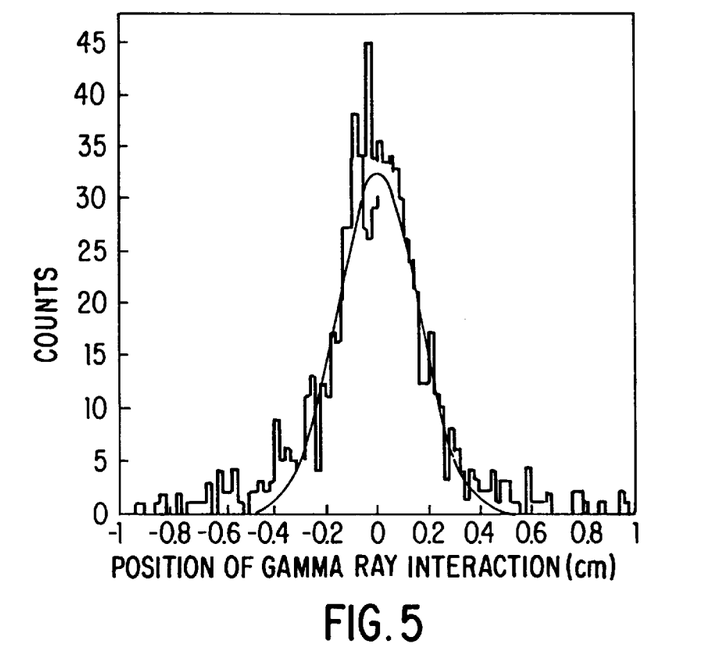
FIG. 5 is a histogram of position resolution for 9 MeV gamma rays.

Due primarily to multiple Coulomb scattering, the achievable position resolution (accuracy of the X and Y determinations) depends on the thickness of the converter and the distance of the two-coordinate position detector therefrom. However, with an array of modules, such as shown in FIG. 3, exposed to 9 MeV gammas using 0.15 mm thick lead converters, 2.0 mm diameter plastic scintillator fibers, and a 5.0 mm thick drift chamber, very accurate determinations can be made, and FIG. 5 shows a histogram of a simulated detected gamma position relative to the actual gamma position. The typical gamma position resolution was 3.5 mm (fwhm—full width half maximum) when 2.5 mm (fwhm) intrinsic position resolution of the drift chamber was employed. The efficiency of the detection of 9 MeV gammas for 150 modules was 84%.

Figure 6:
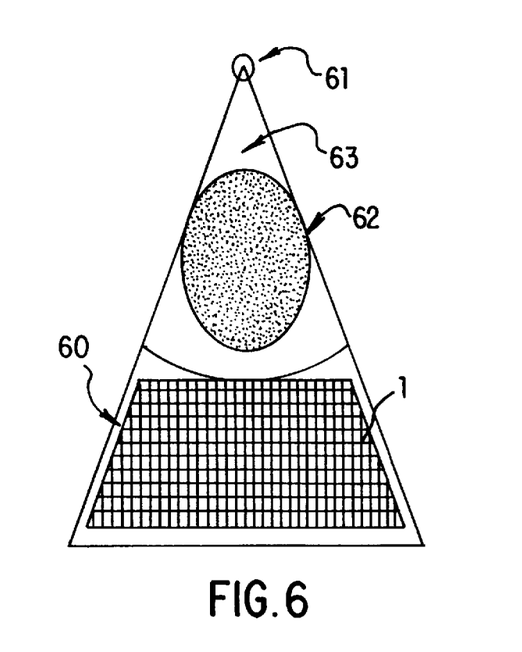
FIG. 6 is a diagrammatic illustration of an arrangement of the array of detectors for scanning an object with gamma rays.

FIG. 6 is a diagrammatic illustration of multiple arrays, generally 60, of modules 1. In this case, a plurality of arrays 60 of modules 1 are disposed adjacent each other with the centerline of each array, as shown in FIG. 3, being parallel. The appropriate number of modules in each array can be determined by measuring (or calculating) the maximum number of modules struck for the interaction of gamma rays from a gamma ray source 61 scanning an object 62 within gamma ray arc 63 of a given energy. The first struck (activated) module in every array can be combined and read out with a single photodetector. The energy sums of horizontal groupings of arrays, for each array, can also be formed to identify in which array the interaction occurred. A conventional electronic logic apparatus can be used to determine uniquely the address (array number, module number, etc.) of the module to be activated and for what time period, so as to determine the horizontal array which has been activated.

Figure 7:
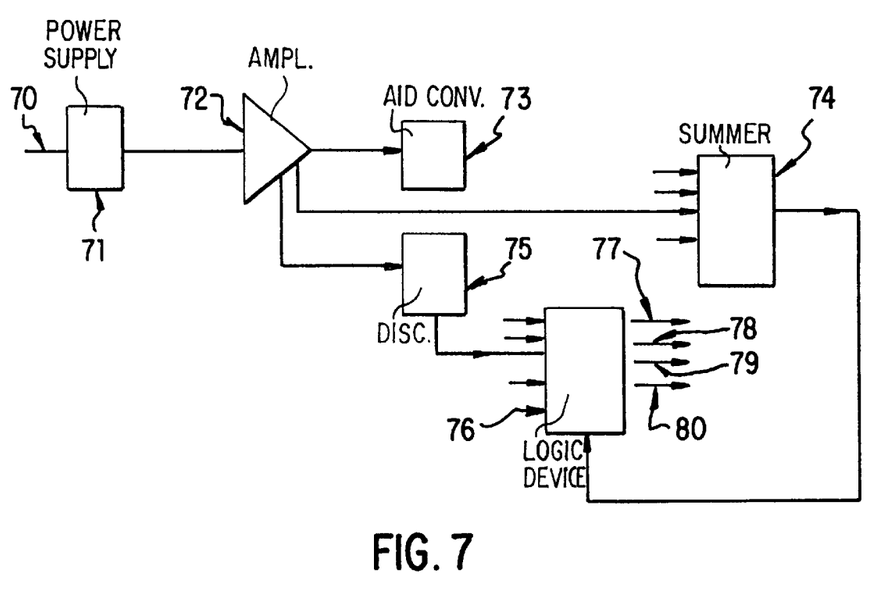
FIG. 7 is a schematic diagram of the monitoring instrumentation (read-out channel) shown in FIG. 1.

While the details of the controller and signal device 8 are described in the Bryman et al, Nuc. Instr. Meth. A234 (1985), 42–46 publication referenced above, a simplified schematic thereof is shown in FIG. 7. In this figure, light 70 from the scintillator 5 is detected in a photo-multiplier tube/power supply 71, and the electrical signal generated thereby is fed to an amplifier 72. The amplified signal is fed to an analog-to-digital converter 73, a scintillator analog summer 74 and a discriminator 75. A "trigger" signal is generated by the summer 74 and causes operation of a logic apparatus 76, in conjunction with feed from discriminator 75 to generate an "open" or "closed" signal 77, 78, 79 and 80 for the grating devices 12 of various modules 1.

Each of the components of the present module and controller and signal device are well known in the art, but these components have not been assembled into a detector module of the present nature. The invention provides the advantage that the first module in an array where the gamma ray is converted to charged particles is readily selectable for sole read-out, allowing a higher degree of read-out channel commonality (multiplexing), and therefore a large factor reduction in the number of required read-out channels. The position resolution response of the detector is uniform, and the three spatial coordinates of the first gamma ray interaction are determined accurately and unambiguously. The modules, being inexpensive, can be produced to cover very large areas with modest costs.

Thus, having described the invention, it is intended that the claimed invention extend to the spirit and scope of the annexed claims.

What is claimed is:

1. A gamma ray detector for determining the position of gamma ray interaction, having at least one module which module comprises:
   (1) a converter for converting gamma rays to charged particles;
   (2) a scintillator for emitting light in response to the charged particles produced by the converter;
   (3) a photodetector to determine when light has been emitted from the scintillator;
   (4) a two-coordinate position detector for determining the X and Y coordinates of the charged particles interacting with the position detector; and
   (5) a controller and signal device for signaling the presence of emitted light in the photodetector and for activating the position detector.

2. The gamma ray detector of claim 1, wherein the converter is a high density material.

3. The gamma ray detector of claim 2, wherein the converter is a metal or plastic.

4. The gamma ray detector of claim 3, wherein the converter is lead.

5. The gamma ray detector of claim 1, wherein the scintillator is a scintillating crystal or plastic.

6. The gamma ray detector of claim 5, wherein the scintillator is a clear scintillating plastic in an elongated fiber configuration and wherein the configuration is flexible.

7. The gamma ray detector of claim 6, wherein the gamma ray detector has a plurality of adjacent scintillators arranged in directions which are substantially transverse to the direction of the gamma ray.

8. The gamma ray detector of claim 7, wherein at least one photodetector is disposed at at least one end of the plurality of scintillators.

9. The gamma ray detector of claim 8, wherein the ends of the plurality of scintillators are bundled together and one photodetector is disposed near the bundled ends.

10. The gamma ray detector of claim 1, wherein the gamma ray being detected is of low energy value, the scintillator is of a scintillating material, and the scintillator also functions as the converter.

11. The gamma ray detector of claim 1, wherein the photodetector is a photomultiplier tube.

12. The gamma ray detector of claim 1, wherein the position detector is selected from a gas gain ionization detector, a multi-wire proportional detector, a micro-strip detector, a micro-gap chamber detector, and a time projection-chamber detector.

13. The gamma ray detector of claim 12, wherein the position detector is a gas gain ionization detector.

14. The gamma ray detector of claim 13, wherein the gas gain ionization detector is a drift chamber detector.

15. The gamma ray detector of claim 14, wherein the drift chamber has: (i) a voltage gradient with decreasing voltages from near one end of the chamber to an opposite end of the chamber; (ii) a grating device near the opposite end of the chamber; (iii) a cathode near the opposite end; and (iiii) an anode disposed between the grating device and the cathode.

16. The gamma ray detector of claim 15, wherein the grating device is opened or closed to passage of ionization electrons in response to the controller and signal device which in turn is responsive to the presence or absence of light in the scintillator as determined by the photodetector.

17. The gamma ray detector of claim 16, wherein the grating device is electrically biased to prevent passage of the ionization electrons therethrough when the photodetector does not sense emitted light in the scintillator and electrically modified to allow passage of the ionization electrons therethrough when the photodetector senses emitted light in the scintillator.

18. The gamma ray detector of claim 17, wherein the cathode determines the Y coordinate of the charged particles by electrical charges induced in the cathode and a time interval between the detection of light emitted in the scintillator and a detection of electrical charges by the anode determines the X coordinate of the charged particles.

19. The gamma ray detector of claim 17, wherein the controller and signal device includes a logic device.

20. The gamma ray detector of claim 1, wherein a plurality of the modules are disposed in an array of modules where center lines of the modules lie substantially on a common axis.

21. The gamma ray detector of claim 20, wherein the cathode of each module is connected to the cathode of an adjacent module so as to form a continuous cathode for the array of modules.

22. The gamma ray detector of claim 20, wherein a plurality of arrays of modules are disposed adjacent each other with the center lines of each array being substantially parallel.

23. The gamma ray detector of claim 21, wherein the controller and signal device of a module in the array which is first charged by a charged particle becomes activated and the controller and signal devices for all other modules in the array remain inactivated.

24. The gamma ray detector of claim 23, wherein a single photodetector and controller and signal device are associated with each array of modules.

* * * * *